H. D. TAYLOR.
OPTICAL INSTRUMENT ESPECIALLY APPLICABLE TO RANGE FINDERS.
APPLICATION FILED OCT. 4, 1913.

1,140,010.

Patented May 18, 1915.

Witnesses:
M. P. Manning
L. E. Morrison

Inventor
Harold D. Taylor
By his Attorneys
Rogers, Kennedy & Campbell

UNITED STATES PATENT OFFICE.

HAROLD DENNIS TAYLOR, OF BISHOPHILL, ENGLAND, ASSIGNOR OF ONE-HALF TO ARTHUR HUNGERFORD POLLEN, OF LONDON, ENGLAND.

OPTICAL INSTRUMENT ESPECIALLY APPLICABLE TO RANGE-FINDERS.

1,140,010.      Specification of Letters Patent.      Patented May 18, 1915.

Application filed October 4, 1913. Serial No. 793,293.

*To all whom it may concern:*

Be it known that I, HAROLD DENNIS TAYLOR, subject of the King of Great Britain, residing at Buckingham Works, Bishophill, York, England, have invented certain new and useful Improvements in Optical Instruments Especially Applicable to Range-Finders, of which the following is a specification.

This invention relates to means for increasing the brilliancy of the image observed in certain classes of optical instruments in which the emergent beam is not of a circular form. The best known instrument of this type is the rangefinder of the kind in which a single telescope objective is employed, the upper half of which projects the image seen by one end of the instrument, and the lower half of which projects the image seen by the other end of the instrument into a common field of view.

The emergent beam in this case is not of a circular form, its dimensions are greater in a horizontal direction than in a vertical direction, and it is consequently ill-adapted to fill the circular pupil of the observer's eye.

By means of this invention, I am enabled to modify the path of the rays through the instrument so that the emergent beam has approximately the same vertical and horizontal dimensions. This has the effect as will be seen hereafter of increasing the brightness of the image.

In order that the leading principle of the invention may be readily understood, I have, in the accompanying drawings, illustrated the various forms of the emergent beam.

Figure 1:
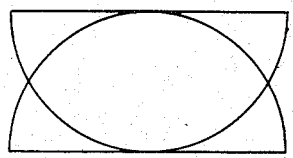
Figure 2:
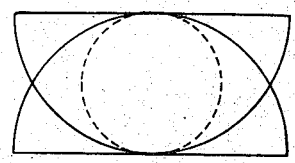
Figure 3:
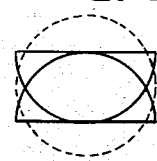
Figure 4:
Figure 5:
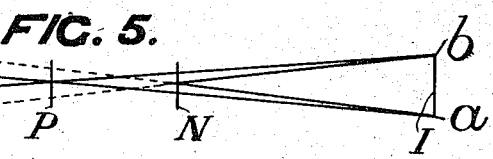
Figure 6:
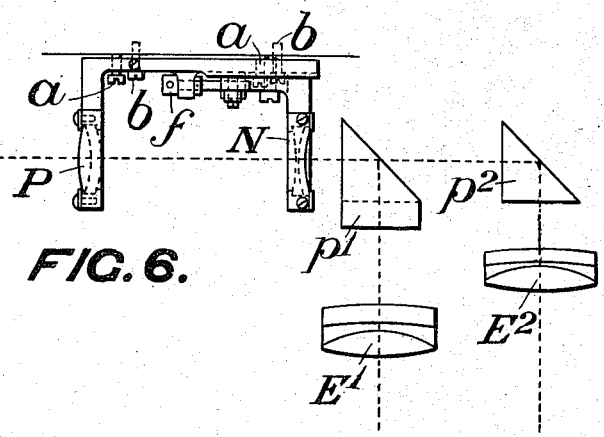
Figure 7:
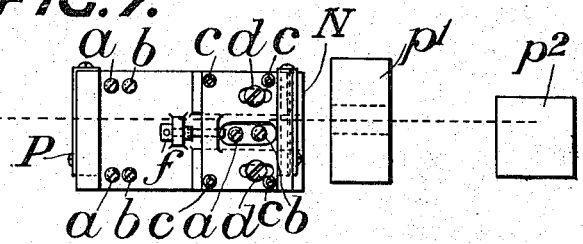
Figure 8:
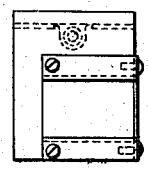
Figure 9:
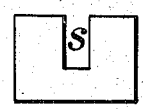

In these drawings: Figure 1 is a diagrammatic view, showing the upper and lower halves of the image superposed, one upon the other; Figs. 2 and 3 are similar views showing, in dotted lines, the forms of the beam relatively to the aperture of the observer's eye; Fig. 4 is also a diagrammatic view showing the result of interposing apparatus in the path of the beam to convert the forms of image appearing in Figs. 1 and 2 into a square image; Fig. 5 is also a diagrammatic view showing the relative positions of the instrumentalities for producing that result; Figs. 6 and 7 are views in elevation and plan, respectively, of a separating prism, a separated pair of positive and negative achromatic lenses, a reflecting prism, and a hand prism; and Figs. 8 and 9 are detail views.

It is well known that the maximum brightness of an image obtainable with an optical instrument is that which is observed when the pupil of the eye is just completely filled with light, that is, when the minimum cross section of the emergent beam is the same as the diameter of the pupil of the eye. Any increase in the magnification reduces the diameter of the emergent beam so that the pupil of the eye will no longer be filled with light and the brightness of the image will suffer, and any diminution of the magnification will result in an increased diameter of the emergent beam. The extra light so obtained cannot enter the pupil of the eye but falls outside of it and will therefore not enhance the brilliancy of the image in any way.

In short base rangefinders, of the type above referred to, the emergent beams from upper and lower images are of the shape shown in Fig. 1, and are in fact the images of the halves of the object glass produced by the various lenses or the like traversed by the beam before it emerges from the eyepiece. Such images can be observed by interposing a ground glass screen in the emergent beams. Owing to the fact that the image of the upper half of the objective is superposed on that of the lower half as shown in Fig. 1 a cross section of the double emergent beam is obtained which has roughly the form of a parallelogram whose width is twice its height. It is clear that this form of emergent beam is ill-adapted to fill the circular aperture of the observer's eye which is shown in dotted lines in Figs. 2 and 3; Fig. 2 shows the case in which the magnification is so chosen as just to fill the eye but leaving a large amount of wasted light on each side, and Fig. 3 shows the case in which almost the whole beam enters the eye but the pupil remains unfilled in its upper and lower parts.

According to this invention, I interpose suitable optical apparatus in the path of the beam to convert the parallelogram-shaped image shown in Fig. 1 into a square image, as shown in Fig. 4, so that with the particular magnification there shown the eye is almost completely filled by the emergent beam and yet only a small amount of light falls outside and is wasted. According to one method of carrying out the invention, I introduce a pair of more or less widely separated cylindrical lenses, one positive and one negative, whereby the horizontal magnifying power is doubled, or thereabout, while the vertical magnifying power remains the same. These lenses may be arranged in any suitable position between the object glass and the eye piece and produce an emergent beam whose cross section much more nearly corresponds in shape with the circular aperture of the observer's eye, so that if a suitable magnification is chosen, the eye can be filled and leave only a small amount of wasted light. A secondary effect produced by these lenses is that the image of the object observed, such as a ship, has its horizontal dimensions doubled relatively to the vertical dimensions, the field of view having the form of a horizontal oval instead of being circular. While this distortion of the image may be objectionable in some cases, it is immaterial in the case of a rangefinder, and the increased luminosity obtained is of the greatest possible importance, while the increased horizontal magnification that is thereby obtained without any sacrifice of light enables the observer to obtain coincidence of the upper and lower images more exactly than he would otherwise do, and so the efficiency of the rangefinder is increased.

I will now give a more exact description of one method of carrying out my invention;

In Figs. 6 and 7, there is to be seen a halving or separating prism H on whose first surfaces are thrown the superimposed images of distant objects formed by the objective situated somewhere to the left. These images are views of the distant object as seen by the upper half of the objective through the left hand window and the lower half of the objective through the right hand window of the rangefinder. Cemented to the halving prism H is an achromatic lens, whose function it is to throw separated-out images of the object glass onto the first of the left reflecting prism $P_1$, which reflects one moiety of light into the left erector lens $E_1$, which latter throws an image of the image on the halving prism H into the left eyepiece. The other moiety of light for the right eye passes through a horizontal rectilinear gap in the left prism $p_1$, (see Fig. 7) and is reflected on the right hand prism $p_2$, into the right erector lens $E^2$ which projects the images into the right eyepiece. The images formed upon the halving prism H are limited or outlined by the circular aperture of the latter.

Now I attain the object of my invention by introducing between the halving lens H and the prism $p_1$, a separated pair of positive and negative cylindrical achromatic lenses P and N whose vertical cross sections are parallelograms acting in the vertical plane simply as pieces of parallel glass but curved in horizontal planes so that the pencils of light from the images on the halving prism H, after emergence from the second cylindrical lens N, appear to come from an image at H whose horizontal dimensions are magnified twice or so, while the vertical dimensions are unaffected. Therefore, the circular outlined field is converted into a horizontal oval and an image of this oval image is projected by $E^1$, and $E^2$ into the two eyepieces.

Fig. 5 shows diagrammatically the action of the two cylindrical lenses in the horizontal or refracting plane. A and B are two points in the principal image, as formed on the halving prism H. P is the positive cylindrical lens of principal focal length=1, the distance H—P being=2. Therefore, P projects an image, $a$—$b$ of A—B, of equal size and at an equal conjugate focal distance behind it. At N, at a distance from $a$—$b$ equal to one-third of the whole distance A—$a$, is placed the negative cylindrical lens N of a principal focal length=$\frac{8}{9}$, which projects a virtual image of $a$—$b$ at the points $a_1$ and $b_1$, the two conjugate focal distances being $1\frac{1}{3}$ and $2\frac{2}{3}$ so that the final virtual image is magnified twice. Thus, the distance between P and N is correctly two-thirds of the principal focal length of P. This is a very convenient arrangement because it enables one to command the degree of magnification by simply moving P to and fro without appreciably moving N. For at equal conjugate focal distances, H P and P $a$, if H P is increased by two per cent., P $a$ is reduced by two per cent. or an almost exactly equal amount, so that image $a$—$b$ remains in about the same position but decreases in size by four per cent. Therefore, $a^1$—$b^1$ and the degree of magnification decreases by four per cent.

I make the two cylindrical achromatic lenses P and N to the following specification. The double convex lens of P and the double concave lens of N are made of densest barium crown glass having a refractive index for the D ray of 1.5725 to 1.5735 and a reciprocal dispersive power for C to F rays of 57.5. The meniscus flint lens of P and meniscus flint lens of N are made of extra dense flint glass having $M_D=1.647$ and a reciprocal dispersive power of 33.9. The radii of curvatures, taking the surfaces left to right, are:—

*Positive lens P.*

$r^1 = +4.22$ in. $r^2 = +2.667$ in. } Center thickness = .23
$r^3 = -2.667$ in. $r^4 = +3.95$ in. } Center thickness = .12
Finished diameter = 1.000 in.
Height 1.35

*Negative lens N.*

$r^1 = -4.43$ in. $r^2 = -2.35$ in. } Center thickness = .115
$r^3 = +2.35$ in. $r^4 = -3.13$ in. } Center thickness = .130
Finished diameter = .68 in.
Height 1.35

The plus sign indicates convexity and the minus sign concavity.

The positive lens P should be about 8.25 to 8.5 inches from the image on the halving prism H and the axial distance over the two cylindrical lenses (including their thicknesses) should be about 2.9 inches, for a horizontal magnification of 2.

Figs. 6 and 7 show the lenses mounted in suitable metal holders, the one carrying the lens N being capable of sliding and carrying it to and fro toward P, and is also capable of being tilted or rotated about the longitudinal axis by means of the four pushing screws *c*. In Fig. 8 the structure appearing in Fig. 6 is shown in elevation, looking from the left; while Fig. 9 shows the prism *p*, as seen from the left, provided with a slot *s* for the passage of a moiety of light toward the prism $p^2$. This is a vitally necessary adjustment and is performed when throwing a converging cone of rays from an objective into the system, the lens N being nearest to the objective, and the image of the point of light to which the cone of rays is converging being examined at a position corresponding to H. If the vertical axes of the lenses P and N are at all out of parallel, the cone of rays, rendered rectangular by the outline of the cylindrical lenses, will not show rectangular sections of the rays when the examining eyepiece is out of focus, but they will show oblique or rhomboidal forms, and the lens N must be rotated by means of the four pushing foot screws C until the image is quite symmetrical and perfect. The whole frame and lenses are then ready for insertion in the instrument to which they are attached by three pairs of antagonist screws *a*, *b*. By means of them the centers of P and N are adjusted into true alinement along the optical axis, with their axes perpendicular to the halving edge at H. Shifting the lens N to and from P by means of the screw *f*, (when the two binding screws *d* are unclamped) will adjust the position of the virtual image at H as formed by the rays in horizontal planes, until it lies in the same plane as the image formed by the rays in the vertical planes which pass through P and N as if they were pieces of parallel glass. Thus, astigmation is eliminated.

The cylindrical lenses require to be exactly centered and edged and the component lenses may be cemented together. No shake of the lenses within their holders should be allowed.

Various modifications of the invention may be made; for instance, the magnification required may be more or less than 2. If less, then the distance H to *a* may be divided more equally by the position of N and the principal focal length of N will then have to be greater. If more, then the position of N will have to divide H to *a* more unequally and its principal focal length will have to be less accordingly. This is a method alternative to the one before described, wherein the magnification was modified by simply moving N to and fro along the axis, P remaining stationary.

What I claim is:—

1. An optical instrument including means for producing an emergent beam non-circular in form in combination with means for rendering the beam more circular in form.

2. An optical instrument including means for producing an emergent beam non-circular in form in combination with magnifying means for rendering the beam more circular in form.

3. An instrument including means for superimposing two non-circular beams, and means for rendering said beams more circular.

4. An optical instrument including means for producing a non-circular emergent beam, and a cylindrical lens system for rendering the beam more circular.

5. An instrument including means for superimposing two non-circular beams, and a cylindrical lens system for rendering the beam more circular.

6. An optical instrument including means for producing a non-circular emergent beam, and a cylindrical lens system adjustable in relation to said first-mentioned means for rendering the beam more circular.

7. An instrument including means for superimposing two non-circular beams and a cylindrical lens system adjustable in relation to said first-mentioned means for rendering the beam more circular.

8. An instrument including in combination means for superimposing two non-circular beams, a cylindrical lens system for rendering the beams more circular, and means for adjusting at least one lens of said system relatively to another lens of the system.

9. An instrument including means for superimposing two non-circular beams and a cylindrical lens system for rendering the beams more circular, in combination with means for sliding and rotating at least one lens of said system.

In testimony whereof I have hereunto set my hand in presence of two subscribing witnesses.

HAROLD DENNIS TAYLOR.

Witnesses:
GEORGE WILLIAM CURRY,
JOHN WILLIAM HOBSON.